United States Patent
Sinha et al.

(10) Patent No.: US 7,543,255 B2
(45) Date of Patent: Jun. 2, 2009

(54) METHOD AND APPARATUS TO REDUCE RANDOM YIELD LOSS

(75) Inventors: Subarnarekha Sinha, Menlo Park, CA (US); Qing Su, Sunnyvale, CA (US); Charles C. Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 120 days.

(21) Appl. No.: 11/725,007

(22) Filed: Mar. 16, 2007

(65) Prior Publication Data

US 2007/0192751 A1     Aug. 16, 2007

(51) Int. Cl.
G06F 17/50     (2006.01)
(52) U.S. Cl. .............................. 716/4; 716/2
(58) Field of Classification Search ............ 716/4–6
See application file for complete search history.

(56) References Cited

U.S. PATENT DOCUMENTS 6,691,293 B2 * 2/2004 Kanazawa .................. 716/11
7,346,865 B2 * 3/2008 Su et al. ...................... 716/4
2006/0095877 A1   5/2006 Su
2007/0028201 A1 * 2/2007 Mehrotra et al. .............. 716/12

OTHER PUBLICATIONS

Subarna Sinha et al., A New Flexible Algorithm for Random Yield Improvement, Proceedings of the 8th International Symposium on Quality Electronic Design (ISQED'07) 0-7695-2795-7/07 IEEE.
Jin-Tai Yan et al., Timing-Constrained Yield-Driven Wiring Reconstruction for Critical Area Minimization, 20th International Conference on VLSI Design (VLSID'07) 0-7695-2762-0/07 IEEE.

* cited by examiner

*Primary Examiner*—Jack Chiang
*Assistant Examiner*—Binh C Tat
(74) *Attorney, Agent, or Firm*—Park, Vaughan & Fleming LLP

(57) ABSTRACT

One embodiment of the present invention provides a system that reduces random yield loss. During operation, the system can receive a design layout. The system may also receive weighting factors that are associated with the particle densities in the metal regions and the empty regions. Next, the system can determine local critical-area-ratios and optimization potentials for a set of wire-segments. The system can then select a wire segment, and compare its local critical-area-ratio with a global critical-area-ratio. Next, the system can use the result of the comparison to determine a layout optimization. The system can then apply the layout optimization to the wire segment to obtain an improved layout.

13 Claims, 5 Drawing Sheets

METHOD AND APPARATUS TO REDUCE RANDOM YIELD LOSS

RELATED APPLICATION

This application is a related to U.S. patent application Ser. No. 10/978,946, entitled, "FAST EVALUATION OF AVERAGE CRITICAL AREA FOR IC LAYOUTS," by inventors Qing Su, Subarnarekha Sinha, and Charles C. Chiang, filed on 1 Nov. 2004, which is hereby incorporated by reference to describe a process to determine a critical area for a design layout.

BACKGROUND

1. Field of the Invention

The present invention relates to integrated circuit design and fabrication. More specifically, the present invention relates to a method and an apparatus to reduce random yield loss.

2. Related Art

As semiconductor manufacturing technologies move into deep sub-micron era, manufacturability and yield related issues are becoming increasingly important. In current processes, yield loss can be caused by many factors, which include random contamination particles, distortions of the printed features during the lithography process, thickness variations from the polishing process, etc. The portion of the yield loss that is caused by random contamination particles is referred to as random yield loss. Reducing the random yield loss is desirable because it can decrease manufacturing costs, thereby increasing the profitability of a semiconductor chip.

SUMMARY

One embodiment of the present invention provides a system that reduces random yield loss. An embodiment may perform layout optimizations that are intelligently guided by a critical area evaluator, thereby ensuring that the layout optimization decreases the random yield loss.

An embodiment of the present invention dynamically selects a layout optimization technique. An embodiment can handle different particle densities for metal and empty regions.

During operation, a system can receive a design layout. The system may also receive weighting factors that are associated with the particle densities in the metal regions and the empty regions. Next, the system can determine local critical-area-ratios and optimization potentials for a set of wire-segments. The system can then select a wire segment using the optimization potentials, and compare its local critical-area-ratio with a global critical-area-ratio. Next, the system can use the result of the comparison to determine a layout optimization. The system can then apply the layout optimization to the wire segment to obtain an improved layout.

DETAILED DESCRIPTION

Integrated Circuit (IC) Design Flow

Figure 1:
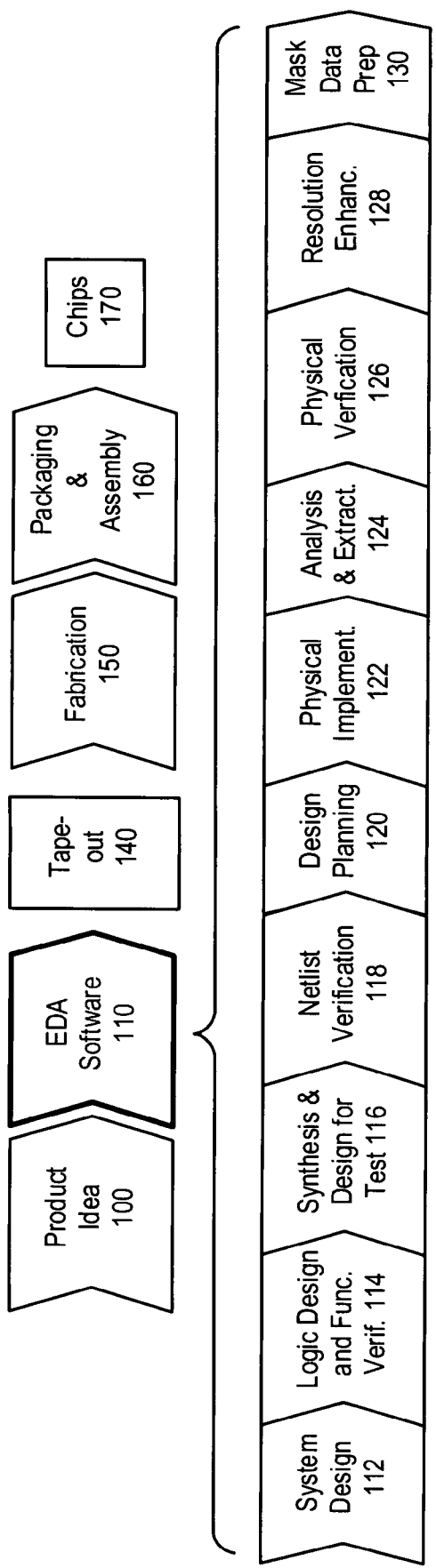
FIG. 1 illustrates various stages in the design and fabrication of an integrated circuit in accordance with an embodiment of the present invention.

FIG. 1 illustrates various stages in the design and fabrication of an integrated circuit in accordance with an embodiment of the present invention.

The process starts with the conception of the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): In this step, the designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above-described steps. One embodiment can be used during the design planning step 120.

Random Yield Loss

Random yield loss can depend on the critical area of a layout. The critical area measures the susceptibility of the design to random contamination particles. Critical area can be defined as the region on the chip where the falling of a contamination particle can cause a catastrophic failure. The critical area can be categorized as open critical area or short critical area based on the type of failure—open or short—that would occur if a random contamination particle were to fall in the critical area. Random yield loss can be viewed as a function of the open and short critical areas.

The particle density can be another parameter that affects the random yield loss. Particle density can be defined as the total particle count divided by the total chip or wafer area. Since particles can be of different sizes, a set of particle density values may be used, wherein each particle density value corresponds to the density of particles whose size is within a specific range.

In order to reduce random yield loss of a layout design, the critical area can be used to guide layout optimization. Layout optimizations may be performed to reduce the critical area, thereby reducing the random yield loss.

Layout optimization has traditionally been driven by area, timing, and power. Conventionally, layout optimizations to reduce critical area are usually added as an afterthought. Critical area optimization is usually performed at the post-routing stage when the layout design has already been optimized for area, timing, and power. Prior art techniques are typically not yield aware, and they usually cannot provide guarantees that the random yield loss will be reduced.

Decreasing the open critical area can increase the short critical area, and vice-versa. For example, increasing the spacing between the wire segments (i.e., wire-spreading) typically reduces the short critical area but increases the open critical area. Similarly, increasing the width of the wire segments (i.e., wire-widening) typically reduces the open critical area but increases the short critical area. Hence, optimization techniques that apply only one type of layout optimization cannot guarantee a reduction in the total critical area. Further, techniques that use one type of optimization before the other also suffer from similar drawbacks. This is because such static approaches implicitly favor one technique over the other, irrespective of which critical area component is larger.

The above-described problems with prior art techniques are further aggravated in current processes due to the fact that particles may preferentially cluster in metal regions or empty regions. In other words, the particle densities may be different in the metal regions versus the empty regions and may vary from one fabrication plant to another and may also vary across process lines. Since particles that fall in the metal regions can cause opens and those that fall in the empty regions can cause shorts, a difference in the particle densities between the metal and empty regions can cause the yield loss contribution to be significantly different for the short and open critical areas. One embodiment of the present invention simultaneously considers both open and short critical areas, as well as the corresponding particle densities, thereby guaranteeing a reduction in random yield loss.

Embodiments can use any type of random yield model to reduce random yield loss. For example, an embodiment can use the Poisson model, in which the random yield $Y_r$, is given by $Y_r = e^{-A_{cr} \cdot D_0}$, where $A_{cr}$ is the critical area and $D_0$ is the particle density. Alternatively, the system can use the Negative Binomial model.

Figure 2A:
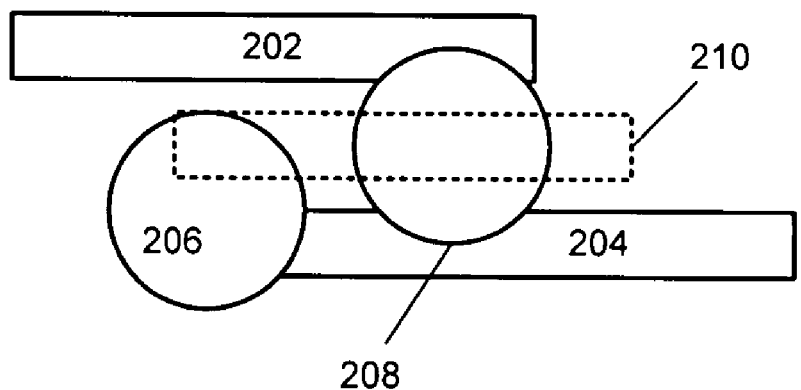
FIG. 2A illustrates a short critical area in accordance with an embodiment of the present invention.

FIG. 2A illustrates a short critical area in accordance with an embodiment of the present invention.

Wire segments 202 and 204 are part of a design layout. Particle 206 overlaps with wire segment 204, but not with wire segment 202. However, particle 208 overlaps with both wire segment 202 and wire segment 204, and hence, can cause a catastrophic failure in the circuit by shorting wire segments 202 and 204. If particle 208's center is located anywhere within area 210, it may cause a short between wire segments 202 and 204. The size of the short critical area may depend on a number of factors, including the size of the particle. Area 210 can be the short critical area that is associated with particles whose size is the same as particle 208. The short critical area associated with larger particles will usually be larger, and the short critical area associated with smaller particles will usually be smaller.

Figure 2B:
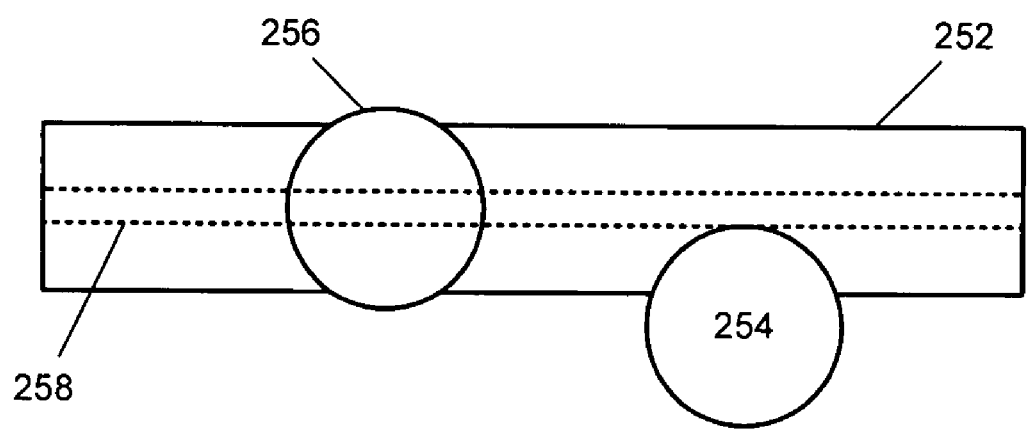
FIG. 2B illustrates an open critical area in accordance with an embodiment of the present invention.

FIG. 2B illustrates an open critical area in accordance with an embodiment of the present invention.

Wire segment 252 is part of a design layout. Particle 254 partially overlaps with the width of wire segment 252. However, particle 256 completely overlaps with the width of wire segment 252 and hence can cause a catastrophic failure in the circuit by causing wire segment 252 to become open circuited. If particle 256's center is located anywhere within area 258, it may cause wire segment 252 to become open circuited. The size of the open critical area may depend on a number of factors, including the size of the particle. Area 258 can be the open critical area that is associated with particles whose size is the same as particle 256. The open critical area associated with larger particles will usually be larger, and the open critical area associated with smaller particles will usually be smaller.

Once the critical areas for all the wire segments are extracted individually, the geometric union of these areas can give the total critical area $A_c(x)$ for particle size x. Next, the total average critical area can be determined by averaging over all the particle sizes. For example, the total average critical area, $A_{cr}$, can be determined using the expression $$A_{cr} = \int_{x_{min}}^{x_{max}} A_c(x) f(x) \, dx, \qquad (1)$$

where $x_{min}$ and $x_{max}$ are the minimal and maximal particle sizes and $f(x)$ is the particle size distribution function.

If a pair of wire segments (i, j) belonging to different nets have segments visible to one another, the short critical area at a particular particle size x can be determined using the expression $$A_s(x) = \begin{cases} 0 & \text{if } x < s_{ij}, \\ (x - s_{ij}) \cdot b_{ij} & \text{if } x \geq s_{ij}, \end{cases} \qquad (2)$$

where $s_{ij}$ is the spacing between the pair of wire segments and $b_{ij}$ is the visible length.

The open critical area can be determined using the expression $$A_o(x) = \begin{cases} 0 & \text{if } x \leq w_i, \\ (x - w_i) \cdot l_i & \text{if } w_i < x \leq D_{max}, \end{cases} \qquad (3)$$

where $w_i$ is the wire segment width and $l_i$ is the wire-segment length.

The above equations can be used to determine the average short and average open critical areas analytically. For example, under a specific set of assumptions, the expressions for average open and short critical area may be turn out to be $$A_s = \frac{b_{ij}}{2 \cdot s_{ij}}, \qquad (4)$$

$$A_o = \frac{l_i}{2 \cdot w_i}. \qquad (5)$$

Equation (4) shows that for same visible length $b_{ij}$, an increase in spacing $s_{ij}$ makes the short critical area smaller. This is the rationale behind wire-spreading techniques, which move a wire segment or a portion of a wire segment away from the neighboring wire-segment with which it has small spacing and large visible length. Similarly, equation (5) shows that wire-widening can reduce the open critical area.

However, only using wire-spreading or wire-widening can negatively impact the total critical area. For example, wire-spreading typically introduces jogs and hence increases the wire-segment length. The wire-segment length may increase by $2 \cdot \delta$, where $\delta$ is the amount by which a wire segment is moved during wire-spreading. Hence, the open critical area may increase to $$\bar{A}_o = \frac{l_i + 2 \cdot \delta}{2 \cdot w_i}.$$

Similarly, increasing the wire-segment width by $\delta$ may reduce the open critical area, but it may increase the short critical area from $$A_s = \frac{b_{ij}}{2 \cdot s_{ij}} + \frac{b_{ik}}{2 \cdot s_{ik}} \text{ to } \bar{A}_s = \frac{b_{ij}}{2 \cdot (s_{ij} - \delta/2)} + \frac{b_{ik}}{2 \cdot (s_{ik} - \delta/2)},$$

where wire segment i is between wire segments j and k, $b_{ij}$ is the visible length between wire segments i and j, $b_{ik}$ is the visible length between wire segments i and k, $s_{ij}$ is the spacing between wire segments i and j, and $s_{ik}$ is the spacing between wire segments i and k. Hence, reducing only the short or open critical area may not reduce the total critical area.

Further, prior art techniques that perform both wire-spreading and wire-widening in a static order also suffer from drawbacks. First, always performing wire-spreading before wire-widening can be wasteful if the short critical area is not a dominant factor in the total yield loss of a given design. An example of such a scenario is when the original open critical area is much larger than the short critical area and hence contributes more to yield loss. Short critical area reduction in this case is undesirable and wasteful since it may not reduce the total critical area because the open critical area might increase. Further, it could introduce manufacturing problems due to the increased presence of jogs.

In addition, a static technique does not take into account the possibility that the short and open critical areas might not necessarily be equally weighted in the random yield calculation. Recall that the random yield loss relies on the critical area and the particle density. Prior art techniques typically assume a uniform particle density across the chip. However, in modern semiconductor manufacturing processes, contamination particles may preferentially cluster in the metal or empty regions of the chip. In contrast to prior art techniques, an embodiment of the present invention handles different particle densities for metal and empty regions.

Weighted Critical Area

One embodiment of the present invention determines the total critical area by weighting the short critical area and the open critical area using weighting factors. The weighting factors may relate to the impact of the two types of critical areas on the random yield loss. Specifically, the weighting factors may be derived from the contamination particle densities in the metal area and the empty area in the design layout.

Recall that the short critical areas are centered between the wire segments, and the open critical areas are centered on the wire segments. To properly account for large particle sizes, the total critical area may be determined by taking the union of the short critical area and the open critical area. Note that, for large particle sizes, the short critical area may overlap with the open critical area. Hence, taking the union ensures that the overlapping critical area is not double counted. However, since large particles are rare, the probability of an overlap between the open critical area and the short critical area is low. Therefore, we can approximate the total critical area to be the sum of short critical area and open critical area.

As mentioned above, the particle density in metal regions may be different from that in empty regions. One embodiment handles this difference in particle densities by introducing weighting factors $w_s$ and $w_o$ for short and open critical areas, respectively, while using the same average particle density $D_0$. This approach for handling the different weighting factors may be advantageous because it can enable the routing tool to use this weight information to guide the optimization suitably. Specifically, the weighted critical area can be determined using the expression $$A_{wtotal} = w_s \cdot A_{short} + w_o \cdot A_{open}, \quad (6)$$

where $A_{wtotal}$ is the weighted total critical area, $A_{short}$ is the short critical area, and $A_{open}$ is the open critical area. Hereinafter, the expression $(w_s \cdot A_{short})$ will be referred to as the weighted short critical area, and the expression $(w_o \cdot A_{open})$ will be referred to as the weighted open critical area.

Note that the weighted critical area can be determined for a wire segment, a group of wire segments, or for all wire segments in a layer. The weighted critical area may be viewed as a proxy for the random yield and reducing this quantity is expected to reduce the random yield loss. One embodiment uses the weighted critical area as the cost function that the layout optimization process tries to minimize.

Layout Optimization

An embodiment performs layout optimizations one layer at a time. During optimization, an embodiment may move wire segments, but not vias. Another embodiment optimizes multiple layers at once, and hence, can move vias in addition to wire segments. Each layer may have a preferred direction of routing, either horizontal or vertical. Since the majority of the wire segments in a layer are expected to be in the preferred direction, an embodiment moves the wire segments in a direction that is orthogonal to the preferred direction of the layer.

In one embodiment, the system may compute an optimization potential for all the wire segments. The optimization potential of a wire segment may be a function of its weighted short and weighted open critical area and can be a measure of both the severity of the problem in the local area and the flexibility available for improvement. An embodiment can select the wire segment with the highest optimization potential and "lock" it, thereby preventing the same wire segment from being optimized in consecutive iterations. The wire segment can then be widened or spread depending on the ratio between the weighted open and the weighted short critical area of the wire segment. The weighted open and weighted short critical areas can provide an indication of which type of critical area has a larger contribution to the weighted critical area of the layer.

The system may then try to reduce the dominant type of critical area using an appropriate layout optimization technique, which can include wire-widening and/or wire-spreading. After layout optimization is performed on a wire segment, the optimization potentials of the remaining unlocked wire-segments can be updated as needed. Alternatively, the optimization potentials may be updated after layout optimization is performed on multiple wire segments. After the optimization potentials are updated, the wire segment with the largest optimization potential among the "unlocked" wire-segments may be selected and the process may be repeated.

Note that the process can dynamically adjust the number of wire segments that are widened and spread in accordance with the weighted open and short critical areas. The amount by which a wire segment is spread or widened may also vary depending on the configuration of its neighboring wire-segments. Since the weighted critical area of the entire layer can be approximated by summing the weighted critical areas of the individual wire segments, reducing the weighted critical area of the individual wire segments can reduce the weighted critical area of the entire layer.

Process for Reducing Random Yield Loss

Figure 3:
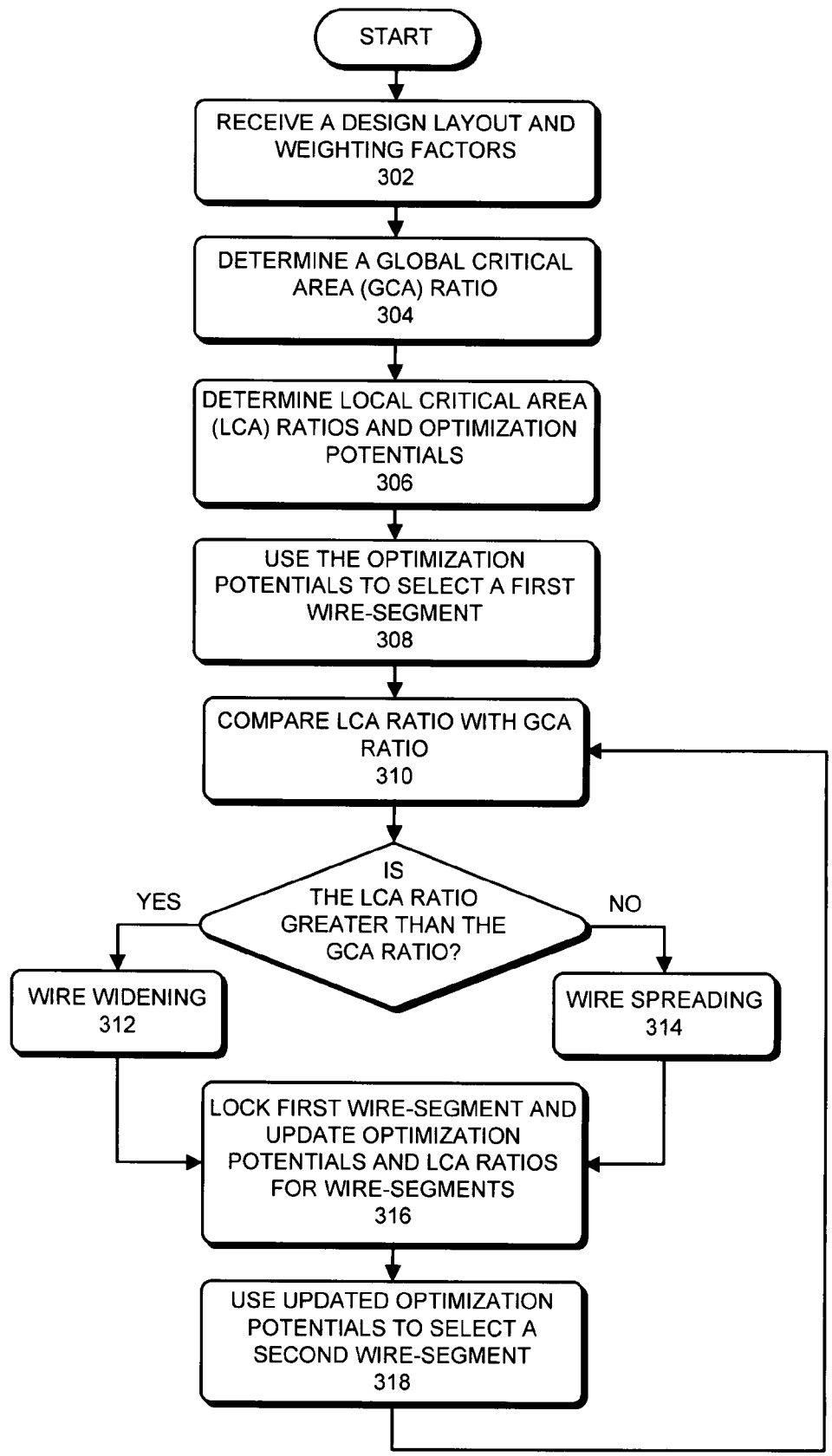
FIG. 3 presents a flowchart that illustrates a process for reducing random yield loss in accordance with an embodiment of the present invention.

FIG. 3 presents a flowchart that illustrates a process for reducing random yield loss in accordance with an embodiment of the present invention.

The process can begin by receiving a design layout and weighting factors (step 302).

The weighting factors can be associated with the particle densities in the metal and empty regions of the design layout. The particle densities are usually specific to the semiconductor manufacturing processes and/or fabrication plant that is expected to be used to fabricate the design layout.

Next, the system can determine a global critical area ratio (step 304). The global critical area ratio can be a function of the weighted open and weighted short critical area of the layer. In one embodiment, the global critical area ratio can be determined by dividing the weighted open critical area for the layer by the weighted short critical area of the layer.

The system can then determine local critical area ratios and optimization potentials for a set of wire-segments in the design layout (step 306). A wire segment can be a portion of a wire or it can be the longest continuous portion of a wire in a specific direction or it can be the whole wire. In one embodiment, the system can determine optimization potentials for a set of wire-segments in the preferred direction of the layout.

The system can determine the local critical area ratio using the weighted open and weighted short critical area of a set of wire-segments. In one embodiment, the system can first determine a weighted open-critical-area for a wire segment. Specifically, the system can determine the weighted open-critical-area by adjusting the open-critical-area with a factor that is associated with the particle density in metal areas. Next, the system can determine a weighted short-critical-area for the wire segment. Specifically, the system can determine the weighted short-critical-area by adjusting the short-critical-area with a factor that is associated with the particle density in empty areas. The system can then determine the local critical-area-ratio using the weighted open-critical-area and the weighted short-critical-area. In one embodiment, the system can divide the weighted open-critical-area by the weighted short-critical-area to obtain the local critical area ratio.

Next, the system can use the optimization potentials to select a first wire-segment (step 308).

In one embodiment, the system can determine the optimization potential for a candidate wire-segment by using the open and short critical areas associated with the candidate wire-segment. The optimization potential of a wire segment may be high if applying a layout optimization to the wire segment is expected to substantially reduce the random yield loss. For example, a candidate wire-segment may have a high optimization potential if the open area on one side of the candidate wire-segment is substantially larger than the open area on the other side of the candidate wire-segment. Similarly, a candidate wire-segment may have a high optimization potential if the width of the candidate wire-segment can be substantially increased without violating a design rule.

In one embodiment, the optimization potential of a wire segment depends on the type of layout optimization that is performed on the wire segment. For example, if wire-spreading is performed, the optimization potential may be equal to the absolute value of the difference between the open critical area on one side of the wire segment and the open critical area on the other side of the wire segment. On the other hand, if wire-widening is performed, the optimization potential may be equal to the maximum increase in width that can be tolerated without violating a design rule. Note that the system may determine the optimization potential using the weighted open-critical-areas and the weighted short-critical-areas.

Once the optimization potentials are determined, the system may select a wire segment with the highest optimization potential. Alternatively, the system may select a group of wire segments that have a high optimization potential, and then randomly select a wire segment from this group of wire segments.

The system can then compare the first wire-segment's local critical area ratio with the global critical area ratio (step 310).

The system can then use the result of the comparison to determine a layout optimization. Next, the system can apply the layout optimization to the first wire-segment to obtain an improved layout. The layout optimization can generally include any polygon manipulation technique that is expected to reduce the random yield loss.

For example, if the local critical area ratio of the selected wire-segment is greater than the global critical area ratio, the system can apply wire-widening to the first wire-segment (step 312). Note that applying wire-widening to the first wire-segment may involve increasing the width of the wire segment.

On the other hand, if the local critical area ratio of the selected wire-segment is less than the global critical area ratio, the system can apply wire-spreading to the first wire-segment (step 314). Note that applying wire-spreading to the first wire-segment may involve moving the wire segment.

In one embodiment, the system determines the spacing-visible neighbors, which are neighboring wire-segments that are "visible" from the first wire-segment and which will be the first to cause a design rule violation. Next, the system uses these spacing-visible neighbors to determine the amount of wire-widening or wire-spreading that can be performed without violating a design rule. The system can represent the "spacing-visible neighbor" relationship using a graph. For example, each wire segment may be represented by a vertex in the graph, and an edge may exist between vertex u and vertex v if and only if the wire segments associated with these vertices are spacing-visible neighbors. A technique for determining spacing-visible neighbors is explained in J. Fang, J. S. K Wong, K. Zhang, and P. Tang, "A new fast constraint graph generation algorithm for VLSI layout compaction," *IEEE International Symposium on Circuits and Systems,* 1991, which is hereby incorporated by reference.

Figure 4:
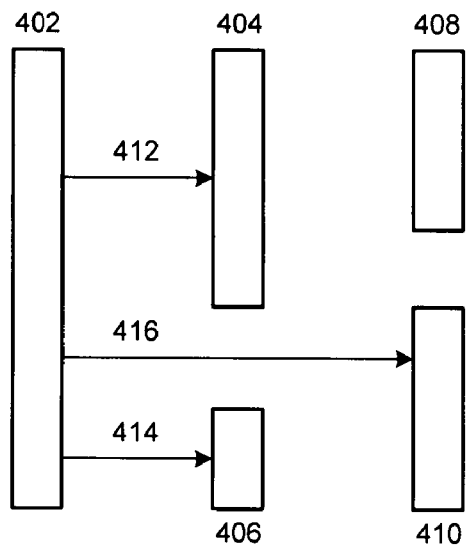
FIG. 4 illustrates exemplary spacing-visible neighbors of a wire segment in accordance with an embodiment of the present invention.

FIG. 4 illustrates exemplary spacing-visible neighbors of a wire segment in accordance with an embodiment of the present invention.

Wire segments 404, 406, 408, and 410 are in proximity to wire segment 402. Wire segments 404, 406, and 410 are "visible" from wire segment 402, but wire segment 408 is not. According to one definition, a second wire-segment may be "visible" from a first wire-segment only if we can draw a line from the first wire-segment to the second wire-segment without intersecting an intervening polygon, wherein the line is drawn in a direction that is orthogonal to the wire segment's direction. For example, wire segments 404, 406, and 410 are visible from wire segment 402 because we can draw lines 412, 414, and 416, respectively. Note that, even if wire segment 410 is a visible neighbor of wire segment 402, wire segment 410 may not be spacing-visible neighbor because applying excessive wire-spreading or wire-widening to wire segment 402 will most likely violate a design rule due to wire segments 404 and/or 406 before it violates a design rule due to wire segment 410. Hence, the spacing-visible neighbors of wire segment 402 may include wire segments 404 and 406, but not wire segment 410.

Figure 5:
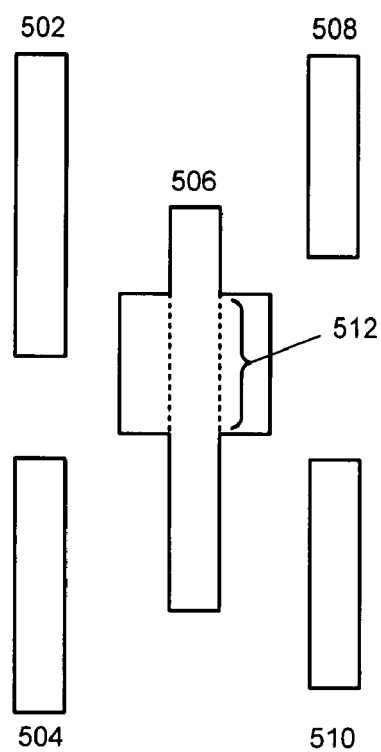
FIG. 5 illustrates how a system can apply wire-widening to a wire segment in accordance with an embodiment of the present invention.

FIG. 5 illustrates how a system can apply wire-widening to a wire segment in accordance with an embodiment of the present invention.

Wire segments 502, 504, 506, 508, and 510 are part of a design layout. Wire segment 512 (dotted line) is part of wire segment 506. The system may apply wire-widening to wire segment 506 to obtain the polygon shown by the solid line. Note that the system may reduce the spacing between the wire segments when it applies wire-widening, thereby increasing the short critical area of the wire segment.

In one embodiment, the system determines an optimal widening for the wire segment using a modified version of the skyline procedure which is described in Udi Manber, "Introduction to Algorithms: A Creative Approach," Addison-Wesley Publishing Company Inc., 1989, which is hereby incorporated by reference. Specifically, the spacing-visible neighbors on both sides of the wire segment can be used. A skyline may be generated for each side of the wire segment such that design rules are not violated. Next, a modified skyline that merges the two skylines (one of the skyline is flipped to ensure both are in the same direction) can be determined and can be used to obtain the optimal width of the wire segment. Suitable restrictions may be imposed to ensure that too many short segments are not created.

Figure 6:
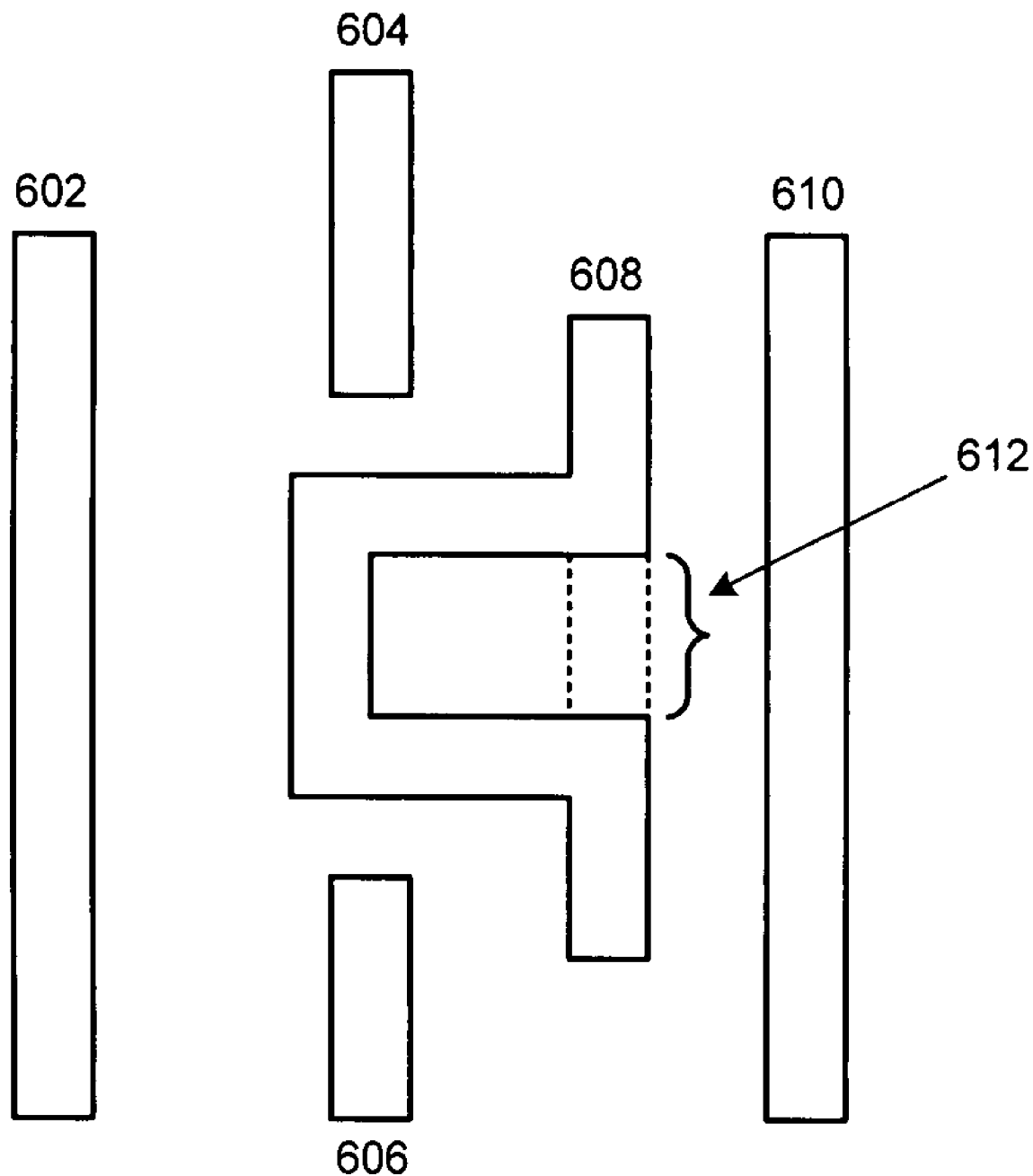
FIG. 6 illustrates how a system can apply wire-spreading to a wire segment in accordance with an embodiment of the present invention.

FIG. 6 illustrates how a system can apply wire-spreading to a wire segment in accordance with an embodiment of the present invention.

Wire segments 602, 604, 606, 608, and 610 are part of a design layout. Wire segment 612 (dotted line) is part of wire segment 608. The system may apply wire-spreading to wire segment 608 to obtain the polygon shown by the solid line. Note that the system may introduce jogs when it applies wire-spreading to the wire segment, thereby increasing the length of the wire segment, and hence, increasing the open critical area of the wire segment.

In one embodiment, the system determines the optimal location of the wire segment. For example, this may be the location at which the short critical area is balanced on both sides and is typically set to be a multiple of the manufacturing grid. Next, the system may push a portion of the wire segment to the optimal location without violating a design rule. Different portions of the wire segment may not be moved by the same amount.

Specifically, in one embodiment, the system may determine an optimal location for different portions of the wire segment using a modified version of the skyline procedure. Design rules can be used to determine the desired distance from each spacing-visible neighbor and the skyline created from these displacements can give the final profile. Thus, the original wire-segment may be replaced by a new wire-segment so that portions of the original wire-segment are at the optimal position. Further, jogs may be introduced to maintain connectivity. Suitable restrictions can be imposed to ensure that the jog length is not smaller than a certain pre-specified amount, as lithographic correction techniques may have problems with short jogs.

The foregoing descriptions of layout optimizations, i.e., wire-widening and wire-spreading, have been presented only for purposes of illustration and description. They are not intended to be exhaustive or to limit the present invention to the forms disclosed. Accordingly, many modifications and variations will be readily apparent to practitioners skilled in the art.

Continuing with the discussion of FIG. 3, the system can lock the first wire-segment and update the local critical area ratios and the optimization potentials for other wire segments (step 316).

In one embodiment, the system can update local critical area ratios and optimization potentials for the first wire-segment's neighbors that are "visible" from the first wire-segment. The system can represent the "visible neighbor" relationship between the wire segments using a graph. For example, each wire segment may be represented by a vertex in the graph, and an edge may exist between vertex u and vertex v if and only if the wire segments associated with these vertices are visible neighbors.

The system can then use the updated optimization potentials to select a second wire-segment (step 318). In one embodiment, the system may select an unlocked wire-segment with the highest optimization potential.

Next, the system can return to step 310 and compare the updated local critical area for the second wire-segment and repeat the process steps for a fixed number of iterations and/or until the random yield loss reduces below an acceptable level and/or until the difference between the random yield loss from one iteration to another is less than or equal to a threshold.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A computer-executed method to reduce random yield loss caused by random contamination particles, the method comprising:
   determining, by computer, weighted open-critical-areas for a set of wire segments;
   determining, by computer, weighted short-critical-areas for the set of wire segments;
   determining, by computer, optimization potentials for the set of wire-segments using the weighted open-critical-areas and the weighted short-critical-areas;
   selecting a wire segment from the set of wire-segments using the optimization potentials
   determining a local critical-area-ratio for the wire segment;
   comparing the local critical-area-ratio with a global critical-area-ratio;
   using the result of the comparison to determine a layout optimization which is one of: moving the wire segment or increasing the width of the wire segment; and
   applying the layout optimization to the wire segment to obtain an improved layout, thereby reducing random yield loss caused by random contamination particles.

2. The computer-executed method of claim 1, wherein determining the weighted open-critical-area includes adjusting the open-critical-area with a factor that is associated with the particle density in metal areas in the design layout.

3. The computer-executed method of claim 1, wherein determining the weighted short-critical-area includes adjusting the short-critical-area with a factor that is associated with the particle density in empty areas in the design layout.

4. The computer-executed method of claim 1, wherein a candidate wire-segment in the set of wire-segments has a high optimization potential if the open area on one side of the candidate wire-segment is substantially larger than the open area on the other side of the candidate wire-segment.

5. The computer-executed method of claim 1, wherein a candidate wire-segment in the set of wire-segments has a high optimization potential if the width of the candidate wire-segment is substantially increasable without violating a design rule.

6. The computer-executed method of claim 1, wherein selecting the wire segment includes selecting a candidate wire-segment with the highest optimization potential.

7. A computer-readable storage medium storing instructions that when executed by a computer cause the computer to perform a method to reduce random yield loss caused by random contamination particles, the method comprising:
   determining by computer weighted open-critical-areas for a set of wire segments;
   determining by computer weighted short-critical-areas for the set of wire segments;
   determining by computer optimization potentials for the set of wire-segments using the weighted open-critical-areas and the weighted short-critical-areas;
   selecting a wire segment from the set of wire-segments using the optimization potentials
   determining a local critical-area-ratio for the wire segment;
   comparing the local critical-area-ratio with a global critical-area-ratio;
   using the result of the comparison to determine a layout optimization and
   applying the layout optimization to the wire segment to obtain an improved layout, thereby reducing random yeild loss caused by random contamination particles.

8. The computer-readable storage medium of claim 7, wherein determining the weighted open-critical-area includes adjusting the open-critical-area with a factor that is associated with the particle density in metal areas in the design layout.

9. The computer-readable storage medium of claim 7, wherein determining the weighted short-critical-area includes adjusting the short-critical-area with a factor that is associated with the particle density in empty areas in the design layout.

10. The computer-readable storage medium of claim 7, wherein a candidate wire-segment in the set of wire-segments has a high optimization potential if the open area on one side of the candidate wire-segment is substantially larger than the open area on the other side of the candidate wire-segment.

11. The computer-readable storage medium of claim 7, wherein a candidate wire-segment in the set of wire-segments has a high optimization potential if the width of the candidate wire-segment is substantially increasable without violating a design rule.

12. The computer-readable storage medium of claim 7, wherein selecting the wire segment includes selecting a candidate wire-segment with the highest optimization potential.

13. An apparatus to reduce random yield loss caused by random contamination particles, the apparatus comprising:
    a first determining mechanism configured to determine weighted open-critical-areas for a set of wire segments;
    a second determining mechanism configured to determine weighted short-critical-areas for the set of wire segments;

a third determining mechanism configured to determine optimization potentials for the set of wire-segments using the weighted open-critical-areas and the weighted short-critical-areas;

a selecting mechanism configured to select a wire segment from the set of wire-segments using the optimization potentials.

a fourth determining mechanism configured to determine a local critical-area-ratio for a wire segment;

a comparing mechanism configured to compare the local critical-area-ratio with a global critical-area-ratio;

a fifth determining mechanism configured to use the result of the comparison to determine a layout optimization which is one of: moving the wire setment or increasing the width of the wire segment; and an applying mechanism configured to apply the layout optimization to the wire segment to obtain an improved layout, thereby reducing yield loss caused by random contamination particles.

* * * * *

UNITED STATES PATENT AND TRADEMARK OFFICE
CERTIFICATE OF CORRECTION

PATENT NO.       : 7,543,255 B2
APPLICATION NO.  : 11/725007
DATED            : June 2, 2009
INVENTOR(S)      : Subarnarekha Sinha et al.

Page 1 of 1

It is certified that error appears in the above-identified patent and that said Letters Patent is hereby corrected as shown below:

In claim 1 (at column 11, line 50), please insert --;-- at the end of the sentence so that the line reads: "using the optimization potentials;".

In claim 7 (at column 12, line 33), please insert --;-- at the end of the sentence so that the line reads: "using the optimization potentials;".

In claim 7 (at column 12, line 33), please insert --which is one of: moving the wire segment or increasing the width of the wire segment;-- after "optimization" so that the line reads: "optimization which is one of: moving the wire segment or increasing the width of the wire segment; and".

In claim 13 (at column 14, line 7), please insert the word --random-- after the word "reducing" so the line reads: "layout, thereby reducing random yield loss caused by random".

Signed and Sealed this

Twenty-fifth Day of August, 2009

David J. Kappos
*Director of the United States Patent and Trademark Office*